(12) United States Patent
Nickel et al.

(10) Patent No.: US 10,079,418 B2
(45) Date of Patent: Sep. 18, 2018

(54) FLEXIBLE TERAHERTZ WAVEGUIDE COMPRISING A DIELECTRIC WAVEGUIDE CORE WHICH IS SUPPORTED WITHIN A SEGMENTED TUBE BY DIELECTRIC THREADS

(71) Applicant: SPINNER GMBH, München (DE)

(72) Inventors: Hans-Ulrich Nickel, Neubiberg (DE); Janno Zovo, München (DE); Thomas Pröckl, Bad Aibling (DE); Marinus Schmid, Feldkirchen-Westerham (DE)

(73) Assignee: SPINNER GMBH, München (DE)

( * ) Notice: Subject to any disclaimer, the term of this patent is extended or adjusted under 35 U.S.C. 154(b) by 0 days.

(21) Appl. No.: 15/360,317

(22) Filed: Nov. 23, 2016

(65) Prior Publication Data

US 2017/0077581 A1    Mar. 16, 2017

Related U.S. Application Data

(63) Continuation of application No. PCT/EP2015/054200, filed on Feb. 27, 2015.

(30) Foreign Application Priority Data

May 28, 2014    (EP) .................................... 14170395

(51) Int. Cl.
| | |
|---|---|
| *H01P 3/12* | (2006.01) |
| *H01P 3/16* | (2006.01) |
| *H01P 3/14* | (2006.01) |
| *H01P 1/02* | (2006.01) |
| *H01P 1/04* | (2006.01) |
| *G02B 6/44* | (2006.01) |

(52) U.S. Cl.
CPC .................. *H01P 3/14* (2013.01); *H01P 1/02* (2013.01); *H01P 1/04* (2013.01); *H01P 3/16* (2013.01); *G02B 6/443* (2013.01); *G02B 6/4461* (2013.01)

(58) Field of Classification Search
CPC .... H01P 3/16; H01P 3/20; H01P 3/121; H01P 3/122; H01P 1/02; H01P 3/14
USPC .......................................... 333/239, 249, 241
See application file for complete search history.

(56) References Cited

U.S. PATENT DOCUMENTS

| | | |
|---|---|---|
| 3,365,534 A | 1/1968 | Volk |
| 4,938,560 A | 7/1990 | Arroyo et al. |
| 5,215,338 A | 6/1993 | Kimura et al. |

(Continued)

FOREIGN PATENT DOCUMENTS

| | | |
|---|---|---|
| CN | 102478410 | 5/2012 |
| DE | 21 15 380 | 10/1972 |

(Continued)

OTHER PUBLICATIONS

The International Search Report dated Jun. 15, 2015 for International Application No. PCT/EP2015/054200.

*Primary Examiner* — Benny Lee
(74) *Attorney, Agent, or Firm* — Yakov S. Sidorin; Quarles & Brady LLP (57) ABSTRACT

A flexible and twistable terahertz waveguide assembly has a flexible waveguide with waveguide flange connectors at its ends. The flexible waveguide comprises a segmented tube of a plurality of tube segments which are connected to each other. The tube encloses a dielectric waveguide which is held by means of threads (filaments) at the center of the tube.

(Continued)

The individual segments are tiltable and/or pivotable against each other, allowing bending and twisting of the waveguide cable.

20 Claims, 7 Drawing Sheets

(56) References Cited

U.S. PATENT DOCUMENTS

| | | |
|---|---|---|
| 5,473,723 A | 12/1995 | Stockman et al. |
| 6,573,813 B1 | 6/2003 | Joannopoulos et al. |
| 2011/0215887 A1 | 9/2011 | Kunes |

FOREIGN PATENT DOCUMENTS

| | | |
|---|---|---|
| DE | 32 34 699 | 3/1984 |
| DE | 32 44 746 | 6/1984 |
| EP | 0 304 141 | 2/1989 |
| EP | 0 318 198 | 5/1989 |
| EP | 2 363 913 | 9/2011 |
| GB | 489 007 | 7/1938 |
| JP | 62-255101 | 11/1986 |
| KR | 10200469658 | 8/2004 |

FLEXIBLE TERAHERTZ WAVEGUIDE COMPRISING A DIELECTRIC WAVEGUIDE CORE WHICH IS SUPPORTED WITHIN A SEGMENTED TUBE BY DIELECTRIC THREADS

CROSS-REFERENCE TO RELATED APPLICATIONS

This application is a continuation of pending International Application No. PCT/EP2015/054200 filed on Feb. 27, 2015, which designates the United States and, in turn, claims priority from European Application No. 14170395.9 filed on May 28, 2014. The disclosure of each of these patent documents is incorporated herein by reference.

BACKGROUND

1. Field of the Invention

The invention relates to a waveguide which can be used in the terahertz frequency range, which is flexible and can be bent and twisted multiple times to a certain extent. It is based on a dielectric waveguide.

2. Description of Relevant Art

For guiding electromagnetic waves in the terahertz range, in most cases waveguides are used. Such waveguides provide a sufficiently high transmission quality, but they have a rigid structure which cannot be bent. Specifically when used in test setups, it is sometimes necessary to adapt for mechanical tolerances of signal inputs and outputs. At lower frequencies, when cables like coaxial cables can be used, cabling between devices is very simple as the cables are flexible and can be adapted to the various needs. Furthermore, articulated lines can be used. These are comparatively expensive.

The German patent DE 32 34 699 C2 discloses a flexible waveguide for millimeter waves, which is made of a corrugated tube. This tube can be bent at least with large radiuses and small angles. Adapting this tube to frequencies in the terahertz range which may include sub millimeter wave length would make the tube extremely expensive and fragile.

The German publication DE 32 44 746 A1 discloses a flexible waveguide for millimeter waves using a dielectric waveguide. Here, the dielectric waveguide has a corrugated outer contour to increase flexibility. Such a waveguide may even be bent at comparatively small radiuses. The drawback is, that such a waveguide has comparatively high losses and radiates at comparatively high levels.

Another dielectric waveguide solution is disclosed in the German publication DE 21 15 380. The dielectric waveguide is supported at the ends thereof and over the length thereof by a post. This dielectric waveguide may be bent, but such a waveguide requires comparatively complex support means and must be kept distant from any other object.

The European patent EP 0 304 141 B1 discloses a dielectric waveguide built into a cable. This cable can be bent and otherwise handled like a cable. The drawback is that the cable has a comparatively complex structure with a plurality of layers around the dielectric core. These additional layers cause unwanted losses at higher frequencies. Due to this complex structure such a cable is comparatively expensive.

Another dielectric waveguide based cable is disclosed in the U.S. Pat. No. 6,573,813 B1. This cable is also very complex and expensive.

A coaxial waveguide cable having a dielectric inner conductor and a metallized outer conductor is disclosed in EP 2 363 913 A1. The inner conductor is supported by annular disks or bay spacers comprising a plurality of arms radiating out from a center collar.

CN 102478410 A discloses an optical fiber sensor. An optical fiber is held in a tube and is bent or extended when the tube is deformed. Therefore deformation of the tube alters the attenuation of the optical fiber.

U.S. Pat. No. 5,215,338 A discloses a flexible supporting sheath for cables, hoses and the like. Such a sheath has an inner bore, through which complete cables including outer insulation are fed.

GB 489 007 A discloses a coaxial cable with a helical supporting structure for holding the center conductor.

U.S. Pat. No. 3,365,534 discloses a coaxial cable with an inner conductor held by dielectric strands.

EP 0 318 198 A1 discloses a dielectric cable, having a core which is surrounded by a cladding.

SUMMARY OF THE INVENTION

The embodiments are based on the object of providing a waveguide for RF signals at comparatively low costs, which may be used in the gigahertz or terahertz frequency range and which is flexible and therefore preferably bendable and twistable. Handling should be comparable to a cable.

Herein, the terahertz frequency range is considered as the frequency range from 0.1 THz to 10 THz. Although this is the preferred frequency range for the embodiments, it is obvious that the embodiments would also work with higher and/or lower frequencies.

In an embodiment, a flexible waveguide assembly comprises a flexible waveguide (which may also be referred to herein as a waveguide cable) and at least one waveguide flange connector. Preferably, the flexible waveguide cable has two ends with a first waveguide flange connector at the first end thereof and a second waveguide flange connector at the second end thereof. There may be other connectors like coaxial connectors at the ends of the flexible waveguide cable. There may also be different types of connectors at the different ends of the flexible waveguide cable.

A flexible waveguide cable comprises at least a dielectric waveguide core which is contained and/or enclosed within a tube. Generally, the tube may be configured as a mantle. Preferably, the tube comprises a plurality of tube segments forming a segmented tube. Most preferably the tube segments are mechanically connected. An electrical connection is not required. Further embodiments are disclosed by referring to such a segmented tube as the most preferred embodiment, although it is obvious that any other kind of tube may be used. Preferably, at least one connection between neighbored tube segments is tiltable and/or pivotable. It is further preferred, if the dielectric waveguide core is held by threads or filaments or strings—herein interchangeably referred to as threads—within the tube and most preferably within the tube segments. Unlike a coaxial system, the segmented tube has no primary wave transmission function. It serves only as a mechanical support and mechanical protection of the dielectric waveguide core.

Transmission of RF signals is performed solely by the dielectric waveguide core. The waveguide preferably is not like a coaxial cable guiding TEM waves or a metallic waveguide for guiding TE or TM waves. Instead it is preferred, if the dielectric waveguide core transfers a hybrid wave having all six field components. It is preferred if the waveguide core is surrounded by a gas like air or nitrogen. Preferably there is a gas layer around the waveguide core having a thickness equal to at least the thickness of the waveguide core. If the thickness of the waveguide core varies in different directions which may be the case with a rectangular waveguide core, the thickness of the gas layer is preferably at least the thickness of the waveguide core in the respective direction. Preferably, the thickness of the gas layer is 3 to 5 times the thickness of the waveguide core.

There may be a near field in the immediate proximity of the dielectric waveguide core. The dielectric waveguide core preferably comprises of a dielectric material having a dielectric coefficient higher than air. Most preferably, the dielectric waveguide core comprises a material with low dielectric losses. It is further preferred, if the material of the dielectric waveguide core is comparatively homogenous to reduce losses, reflections and radiation. Most preferably, the dielectric waveguide core comprises at least one of polytetrafluoroethylene (PTFE), a polyethylene (PE), or a high density polyethylene (HDPE). The dielectric waveguide core preferably comprises a strand or extruded profile of a dielectric material. The dielectric waveguide core may have different cross sections. Preferably it has a rectangular, elliptical or circular cross section. The size of the waveguide core preferably is adapted to the frequency of the RF signals which may be from the Gigahertz to the Terahertz range. The dielectric waveguide for RF signals differs from optical fibers which have an additional cladding around the core. The dielectric waveguide does not need such a cladding. It further differs in the transmission modes used.

The dielectric waveguide core may radiate or exhibit a higher attenuation if a conductive body like a metallic part or even another dielectric waveguide core comes into close proximity to the dielectric waveguide core. Close approaching of two dielectric waveguide cores may also lead to cross coupling. These adverse effects increase with bending or twisting of the dielectric waveguide core. Therefore, it is another purpose of the segmented tube to keep at least a minimum distance between the dielectric waveguide core and other elements. It is preferred, if the segmented tube and most preferably the individual tube segments comprise an isolating material. Preferably, the segmented tube and most preferably the tube segments comprise a plastic material. It is further preferred, if the plastic material itself is a lossy material, asserting dielectric losses to any radiated signal by the dielectric waveguide core. Alternatively, at least one of the tube segments may comprise such dielectric lossy material (have such dielectric lossy materials included in them and/or be covered, for example, painted or coated, by a dielectric lossy material). Such a dielectric lossy material may be carbon. In another embodiment, at least one tube segment comprises an electrically conductive material and/or metal. Such a tube segment may be made of brass or, alternatively or in addition, may have a plastic body with metal coating. Such a metallized or metallic tube segment and a tube made thereof may have some shielding effect, but do not participate in conducting the electromagnetic wave or RF signal.

Tests have shown, that it is not essential to hold the dielectric waveguide core precisely at the center of the segmented tube. Instead, it is sufficient to hold it approximately at the center. Therefore, it is acceptable if during bending or twisting of the segmented tube, the dielectric waveguide core changes its position slightly. This has no significant effect on the transmission characteristics of the dielectric waveguide core. In an embodiment with a plurality of dielectric waveguide cores in a common tube, the dielectric waveguide cores should be arranged to keep a maximum distance with each other and to the tube wall. On the other hand, it is desirable to hold the dielectric waveguide core within the segmented tube with a minimum contact to the dielectric waveguide core. The holding means should have a minimal contact surface with the dielectric waveguide core. This problem is solved by holding the dielectric waveguide core by threads (filaments). Preferably, a thread is a thin and flexible member which mainly can bear tensile forces. A thread may have a significantly smaller cross section than a stud, an arm or a disk as known from prior art and therefore brings less dielectric material into the proximity of the dielectric waveguide core. Preferably, these threads are traversing the segmented tube in a plane approximately under a right angle to the center axis of the tube. Preferably, the threads are of a plastic material which may be a material like nylon, and have a diameter that is small compared to the thickness of the dielectric waveguide core. Preferably, the threads have a circular cross section which allows to minimize the contact area between a thread and the dielectric waveguide core in contact with the thread. Most preferably, there are at least two threads in approximately the same plane under a right angle to the center axis of the dielectric waveguide core, preferably forming an angle of 90 degrees between the threads. It is preferred, if the threads form a cross with its axis close to the center axis of the segmented tube. Preferably, the dielectric waveguide core is held at the center of the tube.

In an embodiment, there may be two pairs of threads forming a gap into which the dielectric waveguide core fits for holding the dielectric waveguide core. In an alternate embodiment, the dielectric waveguide core may be weaved through the intersections of a plurality of pairs of threads, which are spaced apart in the direction of the center axis of the segmented tube.

In another embodiment, there may be thin holding plates or membranes approximately under a right angle to the center axis of the segmented tube. Such thin holding plates or membranes preferably comprise a dielectric material.

The segmented tube allows to guide and to protect the dielectric waveguide core. As the segments are tiltable and pivotable against each other, the tube may be bent and/or twisted. Preferably, at least one tube segment has a curved outer interface section to interface with a curved inner interface section of another tube segment. Most preferably, at least one tube segment has a curved outer interface section and a curved inner interface section. These sections may be connected by a connecting section. A first tube segment attaches to a second tube segment by the first tube segment's curved outer interface section, overlapping the second tube segment's curved inner interface section. It is preferred, if the curved outer interface section and the curved inner interface section have the shape of sphere segments (spherical segments) which fit into each other. For assembly of a segmented tube, preferably a first tube segment is pushed and/or snapped with the curved outer interface section thereof over the curved inner interface section of a second tube segment. To limit the degree of tilt and pivot, recesses and protrusions may be provided. Preferably, there is an outer protrusion at the outer side of the curved inner interface section, the outer protrusion preferably forming a protruding rim extending outwardly from such outer side. This may interface with an inner protrusion which is provided at the inner side of the curved outer interface section and extending inwardly from such inner sider. Tilting is only possible to an angle at which the outer protrusion of a first tube segment establishes contact with the inner protrusion of a second tube segment. For limiting the degree of pivoting, a second inner protrusion may be provided at the inner side of the curved outer interface section and an outer recess may be provided at the curved inner interface section of the tube segments. The outer recess interfaces with the second inner protrusion. The second inner protrusion has a width which his equal to or less the width of the outer recess. If the width is approximately the same, pivoting is not possible. The larger the outer recess is in comparison the second inner protrusion, the larger is the extent of pivoting. Generally, a recess may be used instead of a protrusion, while a protrusion is used instead of a recess.

Furthermore it is preferred, if at least one tube segment has at least one means for holding the dielectric waveguide core. Preferably, this means comprises at least one first thread and a second thread. It is further preferred, if a first and a second thread are arranged approximately under a right angle to form a cross with the crossing point close to the center section of the segmented tube. The dielectric waveguide core may be held by these threads close to the center of the segmented tube.

In a preferred embodiment, at least one end, preferably both ends, of the segmented tube is/are connected to a waveguide flange connector. Such a waveguide flange connector preferably comprises a first tube adaptor, which preferably is adapted to fit to a tube segment. Attached to a tube adaptor preferably is at least one interface components for interfacing the dielectric waveguide core. It is further preferred, if these interface components also provide a mechanical fixation of the dielectric waveguide core, such that the dielectric waveguide core cannot be pulled out of the interface components, for example, if the flexible waveguide cable is bent to a small radius. Furthermore, the interface components may adapt the dielectric waveguide core to a hollow metallic waveguide. This may be done by a tapered end of the dielectric waveguide core.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
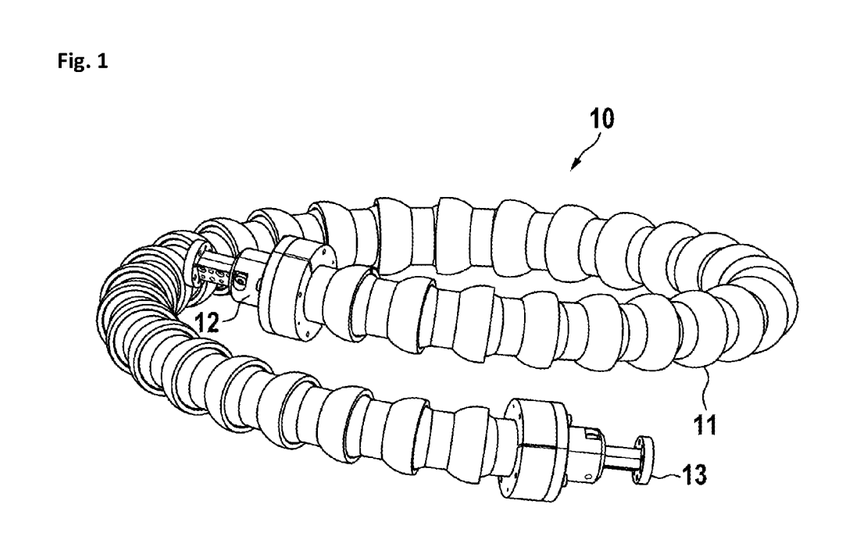
FIG. 1 shows a flexible waveguide assembly.

In FIG. 1, a flexible waveguide assembly 10 is shown. It comprises a flexible waveguide cable 11 with a first waveguide flange connector 12 at its first end and a second waveguide flange connector 13 at its second end. In the embodiment shown, the flexible waveguide assembly is bent to a loop and twisted.

Figure 2:
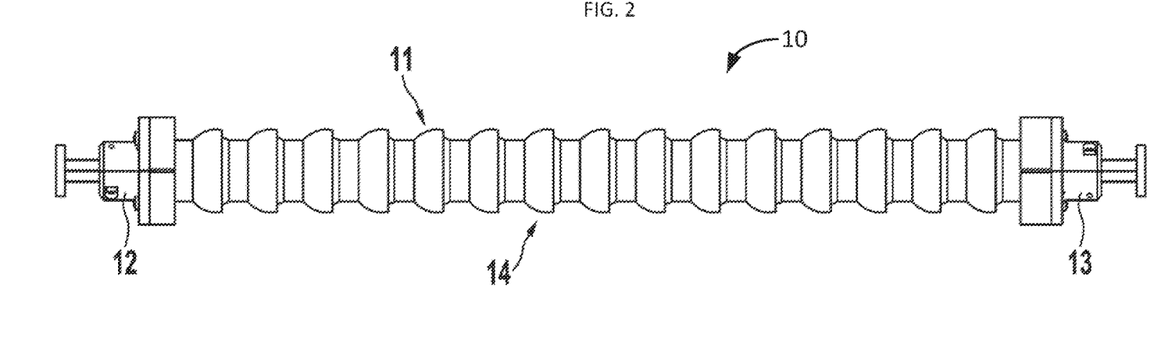
FIG. 2 shows a flexible waveguide assembly in a straight form.

In FIG. 2, the flexible waveguide assembly 10 of FIG. 1 (including the flexible waveguide cable 11, formatted as a segmented tube 14, with the first waveguide flange connector 12 and the second waveguide flange connector 13) is shown in a straight form not bent and twisted. The assembly herein has a different number of tube segments than the embodiment in FIG. 1. Due to a flexible design any number of tube segments can be selected resulting in a broad range of lengths.

Figure 3:
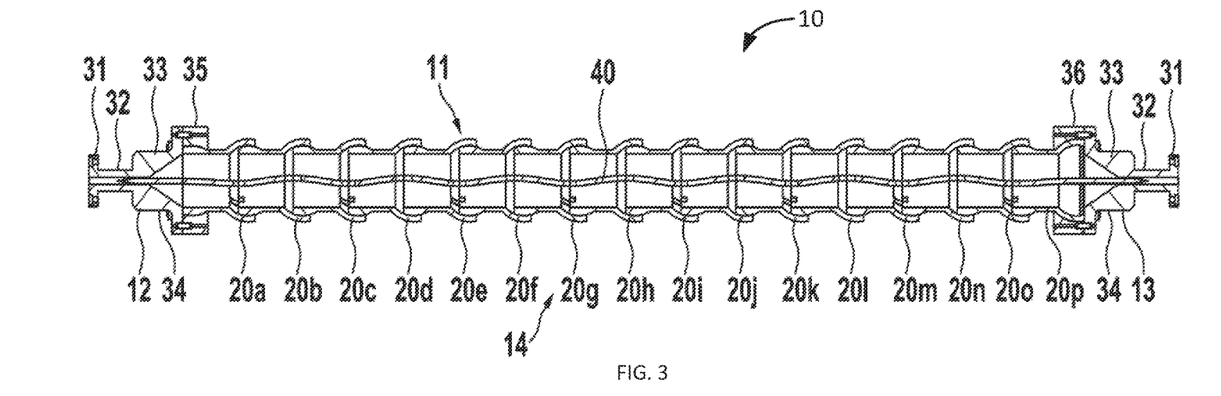
FIG. 3 shows a sectional view of a flexible waveguide assembly.

In FIG. 3, a sectional view of the waveguide assembly of FIG. 2 is shown. At the center of the assembly 10, there is the dielectric waveguide core 40 defining a dielectric waveguide core axis by approximating an axis through the length of the dielectric waveguide core. The flexible waveguide cable 11 (formatted as the segmented tube 14) comprises a plurality of tube segments 20a, 20b, 20c, 20d, 20e, 20f, 20g, 20h, 20i, 20j, 20k, 20l, 20m, 20n, 20o, and 20p. If these tube segments are aligned in a straight form, they form a segmented tube having a segmented tube center axis. The left end of the segmented tube is connected to a first waveguide flange connector 12 comprising a first tube adaptor 35, which preferably is adapted to fit to a curved inner interface section of a tube segment. At the right side of the segmented tube is a second waveguide flange connector 13 comprising a second tube adaptor 36, which preferably is adapted to the curved outer interface section of a tube segment. Attached to these first and second tube adaptors preferably are interface components 33, 34 for interfacing the dielectric waveguide core. It is further preferred, if these interface components also provide a mechanical fixation of the dielectric waveguide core, such that the dielectric waveguide core cannot be pulled out of the interface components, for example, if the flexible waveguide cable is bent to a small radius. Furthermore, the interface components may adapt the dielectric waveguide core to a hollow metallic waveguide. This may be done by a tapered end of the dielectric waveguide core. Connected to the interface components may be any connecting means like a hollow metallic waveguide 32 combined with a waveguide flange 31.

Figure 4:
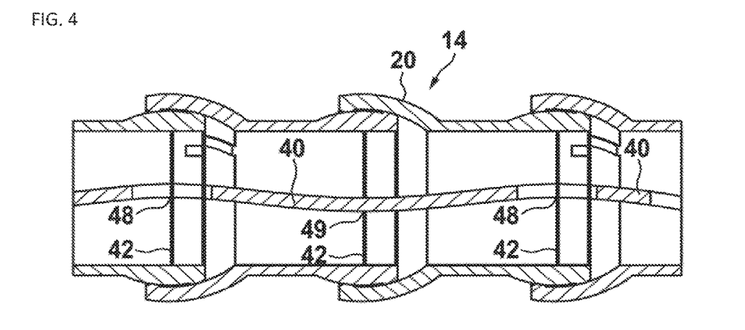
FIG. 4 shows some tube segments coupled together.

In FIG. 4, some tube segments 20 coupled together are shown to form a portion of the segmented tube 14. There are second threads 42 attached to the tube segments and first threads (not shown in this sectional view) for holding the dielectric waveguide core 40. Due to this specific arrangement, the dielectric waveguide core may be slightly curved.

The tube segments may be connected to each other by snapping a curved outer interface section on the curved inner interface section of another tube segment. This may result in a form fit. Although this embodiment shows tube segments having one curved outer interface and one curved inner interface, the embodiments would also work with tube segments having two curved outer interfaces or two curved inner interfaces, as long as one curved outer interface and one curved inner interface are connected. Furthermore, in this figure first waveguide position 48 and second waveguide position 49 are indicated. Viewing along the tube axis in this figure from the left to the right, the first position 48 may be in the top left quadrant formed by the crossing threads in a first tube segment, while the second position 49 is in the right bottom quadrant formed by the crossing threads in a second tube segment. In this embodiment, the threads are not at the ends of the tube segments, but instead at the center of the sphere shaped curved outer interface section. In alternate embodiments, the threads may be at any position of the tube segments.

Figure 5A:
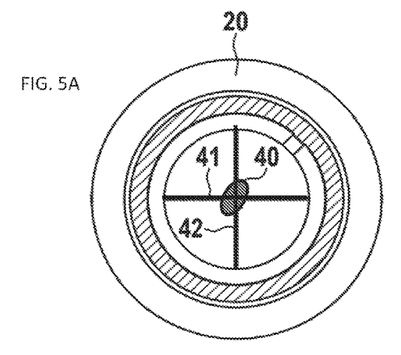
FIGS. 5A and 5B show views of tube segments at a right angle to the center axis of the tube.
Figure 5B:
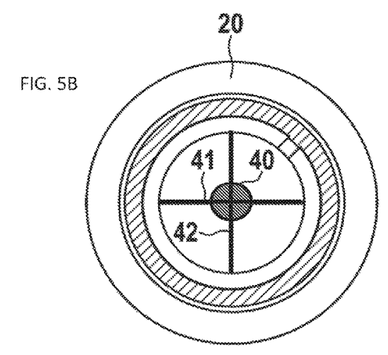

In FIG. 5A, a view of a tube segment 20 (at a right angle to the center axis of the segmented tube 14) is shown. Here, first threads 41 and second threads 42 can be seen which hold the dielectric waveguide core 40 (schematically shown to have an elliptical cross-section) close to the center of the segmented tube. FIG. 5B illustrates a view of the tube segment 20 similar to that of FIG. 5A, also containing first threads 41 and second threads 42, but with the dielectric waveguide core 40 schematically shown to have a circular cross-section.

Figure 6:
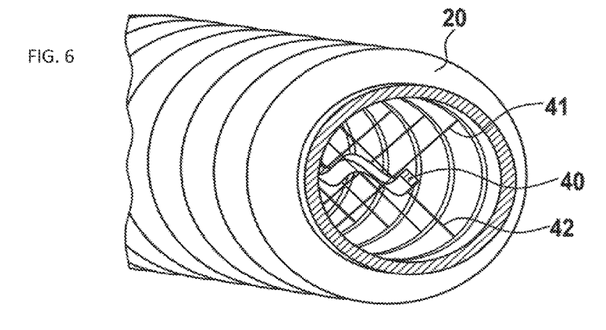
FIG. 6 shows a perspective view of a segmented tube.

In FIG. 6, a perspective view of a segmented tube is shown, with a numeral 20 indicating one of the tube segments. Here, the plurality of first threads 41 and second threads 42 can be seen. It can further be seen, how the dielectric waveguide core 40 is weaved through the sequence of pairs of first and second threads.

Figure 7:
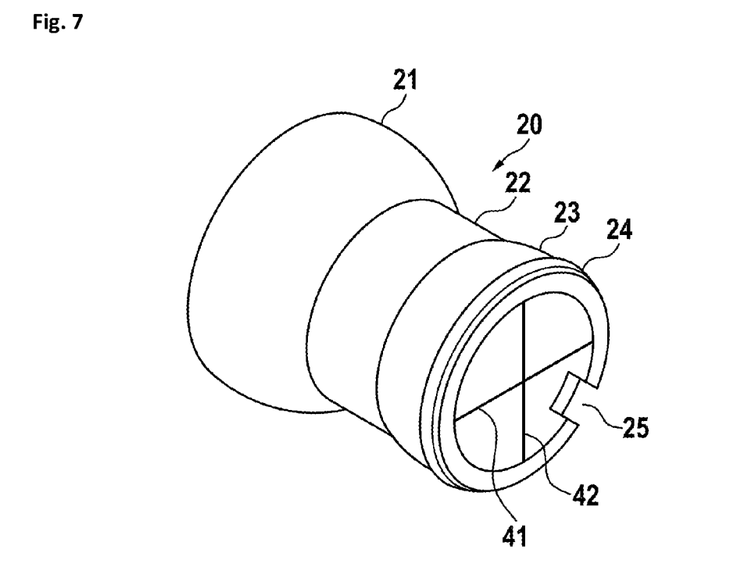
FIG. 7 shows a first view of a tube segment.

In FIG. 7, a first view of a tube segment 20 is shown. The tube segments have a curved outer interface section 21 (with an outer surface preferably shaped as a segment of a sphere), a connecting section 22, and a curved inner interface section 23. It is preferred, that the curved inner interface section 23 has an outer protrusion 24, which forms a protruding rim around the curved inner interface section 23. In this protrusion 24, there may be an outer recess like a notch or recess 25. Furthermore, a first thread 41 and a second thread 42 can be seen which have a crossed shape and cross under an angle of approximately 90 degrees.

Figure 8:
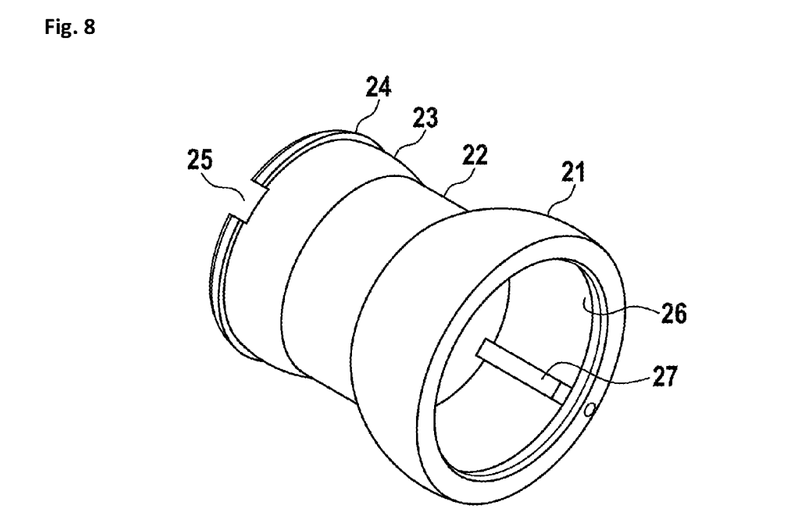
FIG. 8 shows a second view of a tube segment.

In FIG. 8, a second view of the tube segment of FIG. 7 is shown from the opposite side, as compared with the previous view of FIG. 7. Numerals 22 and 23 are designating, again, the connecting section and the curved inner interface section, respectively. Here, an inner protrusion 26 within the curved outer interface section 21 can be seen. There is further a second inner protrusion 27 for interfacing with the outer notch or recess 25 to limit the pivoting or rotating of neighbored tube segments. The inner protrusion 26 may interface with the outer protrusion 24 and limit the angle of tilt between neighbored tube segments.

Figure 9:
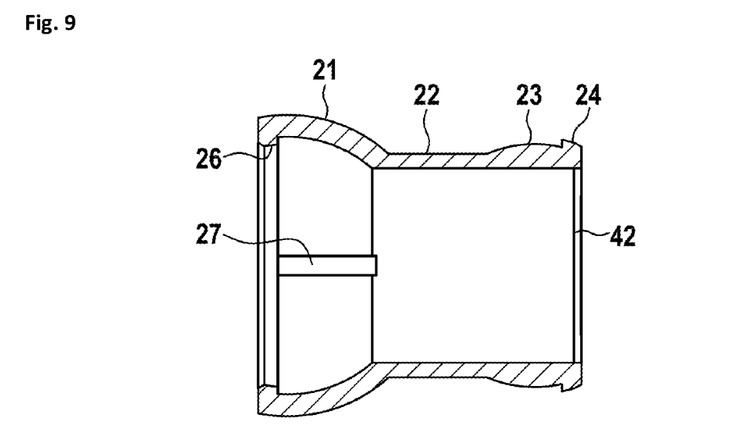
FIG. 9 shows a sectional view of a tube segment.

FIG. 9 shows a sectional view of a tube segment; as shown by the previous figures, numeral 21 indicates a curved outer interface section, numeral 22 indicates a connecting section, numeral 23 indicates a curved inner interface section, numeral 24 indicates an outer protrusion, numeral 26 indicates an inner protrusion, numeral 27 indicates a second inner protrusion. Second thread(s) are labelled again with the numeral 42.

Figure 10:
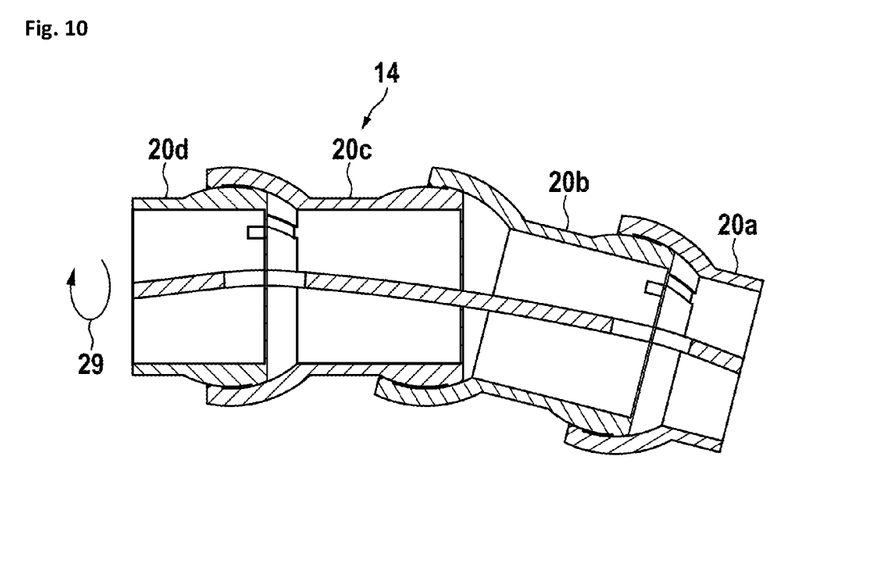
FIG. 10 shows tilted tube segments.

In FIG. 10, tilted tube segments 20a, 20b, 20c, and 20d of the segmented tube 14 are shown. Here, for example tube segment 20c is tilted against tube segment 20b. Generally, not only the segments shown in this example can be tilted. All other segments may be tilted, too, to obtain a curved waveguide cable. Furthermore, the tube segments may be pivoted (rotated about a small angle), for example as indicated by arrow 29, which is a pivoting movement around the center axis of a tube segment. To obtain larger angles, preferably a plurality and most preferably all tube segments are pivotable. This allows twisting of the cable. Twisting is an important feature, specifically if the flexible waveguide assembly has waveguide connectors, as these waveguide connectors can only be mounted under a certain angle of pivoting. Different angles of pivoting must be compensated by a twistable, flexible waveguide cable.

In the following FIGS. 11a, 11b, 11c, 11d, 12a, 12b, 13a, 13b, 14, and 15, embodiments of holding threads are shown. In each of these figures, the dielectric waveguide core 40 is shown to have, as an example, a rectangular cross-section. Herein the term thread is used for filament like structures comprising a dielectric and nonconductive material. The threads may be held by holes in the tube segment body. In an alternate embodiment, the threads may be cast or molded into a tube segment. For example, at least one thread of the threads, configured to support the dielectric waveguide core, may be molded into an inner surface of a given tube segment. For example, first thread 41 and second thread 42 which may be cast into the inner surface of a tube segment to cross one another as viewed along an axis of the tube segment (as shown in FIGS. 12a, 12b, for example). Furthermore, at least one of the threads may be cast in one piece with a tube segment.

Figure 11A:
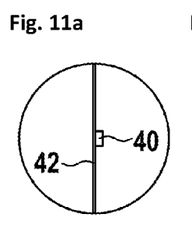
FIGS. 11a to 11d show a first embodiment of holding threads.
Figure 11B:
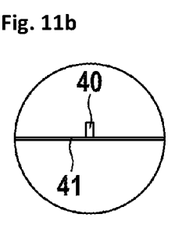
Figure 11C:
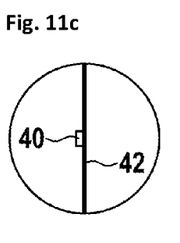
Figure 11D:
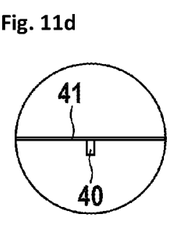
Figure 12A:
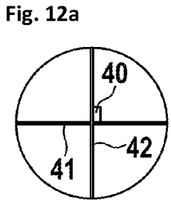
FIGS. 12a and 12b show another kind of supporting by crossed wires.
Figure 12B:
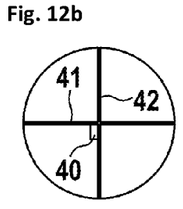

In FIGS. 11a to 11d, a first embodiment of holding threads is shown. The circles schematically indicate a view along the center axis of the tube, similar to the view shown in FIGS. 5A, 5B. Preferably, each of the circles shows a tube segment with corresponding arrangement of threads. It is obvious, that a plurality of threads may be attached to the same tube segment which, for example, may result in two or more of these circles as shown below to be realized in the same tube segment. Alternatively, there may be a thread in each second, third, or a higher number of tube segments. According to FIG. 11a, there is a first tube segment having a thread 42 which in this view may be vertical, guiding the electric waveguide core 40 to the right. The next tube segment may, as shown in FIG. 11b, may have a thread 41 which preferably is formed at a right angle to the previous segment's thread 42, in this embodiment supporting the dielectric waveguide core 40 on the top thereof. As shown in FIG. 11c, the third tube segment may again have a vertical thread 42, now supporting the dielectric waveguide core 40 on the left side thereof. Finally, there is another horizontal thread 41 as shown in FIG. 11d, which is supporting the dielectric waveguide core 40 below the thread. It is obvious that the orientation of the threads is relative to the orientation of the tube. This means if the tube is rotated, the orientation of the threads rotates with the tube. The basic concept of holding the dielectric waveguide core by threads is by alternatingly supporting the dielectric waveguide core on different sides thereof by threads. This works well, if the dielectric waveguide core has a certain stiffness, which it would have if it made for example from HDPE. This kind of support allows a very simple installation of the dielectric waveguide core in the tube. Due to the low number of contacts and the low contact areas between the dielectric waveguide core and the threads, this has little effect on signal transmission. Finally, the dielectric waveguide core may move to some extent, when the tube is tilted and/or pivoted to follow this movement. In the embodiment shown in this figure, two different kinds of tube segments, one with a horizontal thread and another with a vertical thread, may be used. Alternatingly, the tube segments may be mounted rotated about 90 degrees.

In FIGS. 12a and 12b, another kind of supporting is shown, which is similar to that illustrated in FIGS. 11a, 11b, 11c, 11d, but now using crossed wires is shown. In FIG. 12a, there are two threads 41 and 42, which preferably have an intersection. As shown in FIG. 12a, the dielectric waveguide core 40 is supported at one side of the intersection which is the right top side in this example. According to FIG. 12b, the next tube section has an intersection of threads 41, 42 supporting the dielectric waveguide core 40 at the opposite side, which is the left bottom side in this example. In contrast to the embodiment shown, for example, in FIGS. 11a, 11b, 11c, and 11d, this embodiment uses the same type of threads for each segment and results in a more rigid support of the dielectric waveguide core. In this embodiment, the threads are crossing at the center of the tube segments. In another embodiment, the crossing of the threads is offset from the center of the tubes, such that the dielectric waveguide core is held at the center of the tube segments.

Figure 13A:
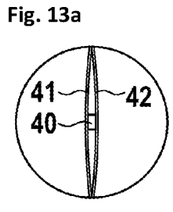
FIGS. 13a and 13b show another embodiment with non-intersecting threads.

In FIG. 13a, two approximately parallel and non-intersecting threads 41, 42 in approximately vertical direction hold the dielectric waveguide core 40 in a horizontal direction. The dielectric waveguide core may slide slightly in vertical direction. To hold the dielectric waveguide core 40 in a vertical direction, according to FIG. 13b, two further approximately parallel and non-intersecting threads 41, 42 are provided.

Figure 14:
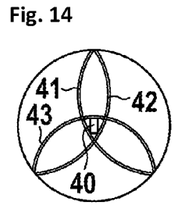
FIG. 14 shows three threads.

In FIG. 14, three threads 41, 42, 43 are shown which are held in about 120 degree angles difference by a tube segment, and so positioned these threads affix the dielectric waveguide core 40 among these threads. In in an alternative embodiment, there may be four threads which are held in about 90 degree angles difference by a tube segment.

Figure 13B:
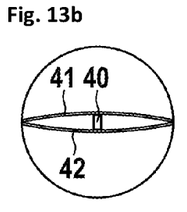
Figure 15:
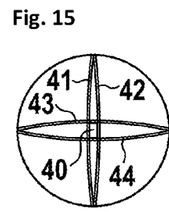
FIG. 15 shows a combination of FIGS. 13a, 13b.

In FIG. 15, a combination of FIGS. 13a and 13b is shown in single tube segment, by using first threads 41, second threads 42, third threads 43, and fourth threads 44. This results in a very stiff support of the dielectric waveguide core 40.

Figure 16:
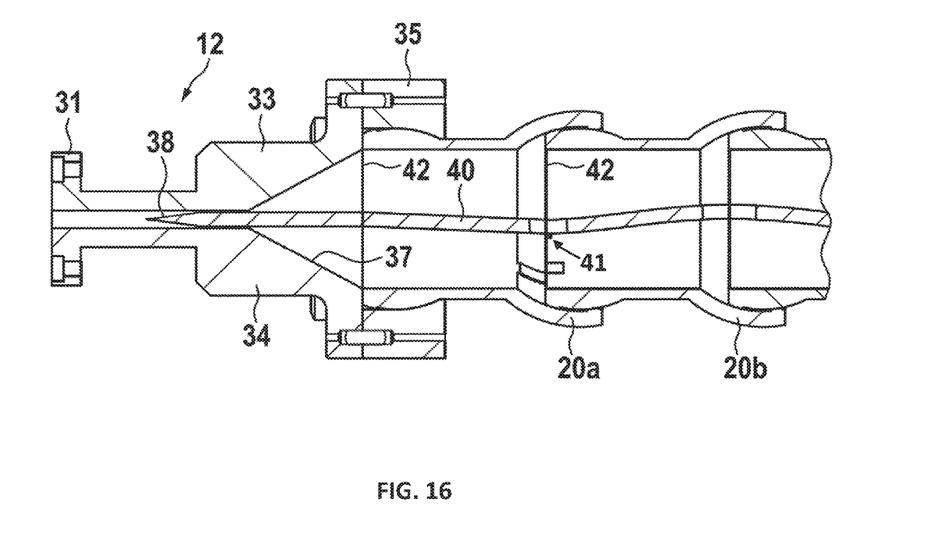
FIG. 16 shows a waveguide flange connector in more detail.

In FIG. 16 a waveguide flange connector 12 is shown in more detail (and also illustrate a portion of the segmented tube formed by the tube segments 20a and 20b, affixed in the first tube adapter 35 that is connected to the interface components 33, 34). The interface components 33, 34 are configured to form a slope 37 dimensioned for continuous impedance matching from the hollow metallic waveguide at the left, connected by the flange 31, to the dielectric waveguide core 40. Numerals 41, 42 indicate, again, the first and second threads. Furthermore, the dielectric waveguide core 40 is shown tapered at end 38.

It will be appreciated by those skilled in the art having the benefit of this disclosure that this invention is believed to provide a dielectric waveguide for Gigahertz and/or Terahertz signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 flexible waveguide assembly
11 flexible waveguide cable
12 first waveguide flange connector
13 second waveguide flange connector
14 segmented tube
20a-20p tube segments
21 curved outer interface section
22 connecting section
23 curved inner interface section
24 outer protrusion
25 outer recess
26 inner protrusion
27 second inner protrusion
29 pivot direction
31 waveguide flange
32 hollow metallic waveguide
33, 34 interface components
35 first tube adapter
36 second tube adapter
37 slope
38 tapered end of dielectric waveguide core
40 dielectric waveguide core
41 first threads
42 second threads
43 third threads
44 fourth threads
48 first dielectric waveguide position
49 second dielectric waveguide position

The invention claimed is:

1. A flexible waveguide cable for the gigahertz or terahertz frequency range, comprising
a segmented tube enclosing a dielectric waveguide core, the segmented tube comprising a plurality of tube segments mechanically connected to each other, wherein the dielectric waveguide core is held within the tube by means of threads made of a dielectric material, wherein each of said threads is attached at opposite ends thereof to a corresponding tube segment from the plurality of tube segments;
said flexible waveguide cable being a non-coaxial cable, wherein
(i) the segmented tube has no primary wave transmission function and is configured to serve only as a mechanical support and mechanical protection of the dielectric waveguide core,
(ii) the dielectric waveguide core is surrounded by and separated from an inner surface of the segmented tube by a layer of gas having thickness equal to or larger than a thickness of the dielectric waveguide core, and
(iii) in operation of the cable, signal transmission is performed only by the dielectric waveguide core.

2. A flexible waveguide assembly comprising the flexible waveguide cable according to claim 1, having a first end and a second end, wherein a first waveguide connector is at the first end and a second waveguide connector is at the second end.

3. A flexible waveguide cable according to claim 1, wherein
at least one tube segment from said plurality of tube segments comprises a curved outer interface section dimensioned and configured to connect with a curved inner interface section of another tube segment from said plurality of tube segments.

4. A flexible waveguide cable according to claim 3, wherein
at least one curved outer interface section or at least one curved inner interface section of said at least one tube segment from said plurality of tube segments has a shape of a sphere segment.

5. A flexible waveguide cable according to claim 3, wherein an outer side of said curved inner interface section has an outer protrusion extending outwardly therefrom and an inner side of said curved outer interface section has an inner protrusion extending inwardly therefrom, said outer and inner protrusions interfacing with one another.

6. A flexible waveguide cable according to claim 3, wherein
an inner side of said curved outer interface section has an inner protrusion extending inwardly therefrom and said curved inner interface section has an outer recess, said inner protrusion and outer recess configured to cooperate to limit a degree of pivoting of the cable.

7. A flexible waveguide cable according to claim 1, wherein
at least one thread of said threads, configured to support the dielectric waveguide core, is molded into a tube segment from said plurality of tube segments.

8. A flexible waveguide cable according to claim 1, wherein
at least two threads of said threads are disposed inside a first tube segment of the plurality of tube segments to cross each other close to a center of the tube, said at least two threads configured to provide support for the dielectric waveguide core.

9. A flexible waveguide cable according to claim 8, wherein a second tube segment of the plurality of tube segments adjacent to the first tube segment contains at least two auxiliary threads of said threads disposed inside the second tube segment and
the dielectric waveguide core is weaved through the at least two threads of said first tube segment and the at least two auxiliary threads of said second tube segment.

10. A flexible waveguide cable according to claim 1, wherein
at least one tube segment of said plurality of tube segments comprises a dielectric lossy material or is covered by paint or a dielectric lossy material.

11. A flexible waveguide cable according to claim 1, wherein
at least one tube segment of said plurality of tube segments contains at least one of an electrically conductive material and metal.

12. A flexible waveguide cable according to claim 1, wherein
the dielectric waveguide core is a strand of dielectric material.

13. A flexible waveguide cable according to claim 1, wherein
the dielectric waveguide core comprises at least one of polytetrafluoroethylene (PTFE), a polyethylene (PE), or a high density polyethylene (HDPE).

14. A flexible waveguide cable according to claim 1, wherein
the dielectric waveguide core has a cross section selected from a group consisting of rectangular, elliptical, and circular cross sections, and wherein the thickness of the layer of gas is at least 3 to 5 times the thickness of the dielectric waveguide core.

15. A flexible waveguide cable according to claim 1, wherein
the dielectric waveguide core is twisted.

16. A flexible waveguide cable according to claim 1, wherein
first and second threads of said threads are disposed in a plane formed by a cross-section, of a tube segment from the plurality of tube segments, that is perpendicular to an axis of the dielectric waveguide core.

17. A flexible waveguide cable according to claim 16, wherein the first and second threads of said threads are configured to not intersect each other at a center of said segmented tube and support the dielectric waveguide core at a center of said segmented tube in a gap between the first and second threads.

18. A flexible waveguide cable according to claim 17, further comprising a third thread located in said plane,
wherein an inner surface of a chosen segment, from the plurality of segments, includes a group of surface locations at intersection of said plane and the inner surface, the group of surface locations including first, second, and third surface locations,
wherein angular separations between any two surface locations from the group of surface locations are the same as viewed from a center of said chosen tube segment,
wherein opposite end of each of the first, second, and third threads are affixed to two different surface locations, from the group of surface locations, such that only two thread ends are affixed to each of surface locations from the group of surface locations, and
wherein the dielectric waveguide core is held in a gap formed by all of the first, second, and third threads.

19. A flexible waveguide cable according to claim 18, wherein said angular separation is 120 degrees.

20. A flexible waveguide cable according to claim 17, further comprising third and fourth threads configured in the plane to not intersect each other at the center of said segmented tube and directed perpendicularly to the first and second threads,
wherein the dielectric waveguide core is held in a gap formed by all of the first, second, third, and fourth threads.

* * * * *